May 5, 1931.  W. A. BARNES  1,804,196
ELECTRICAL COOKING APPLIANCE
Filed Nov. 11, 1929
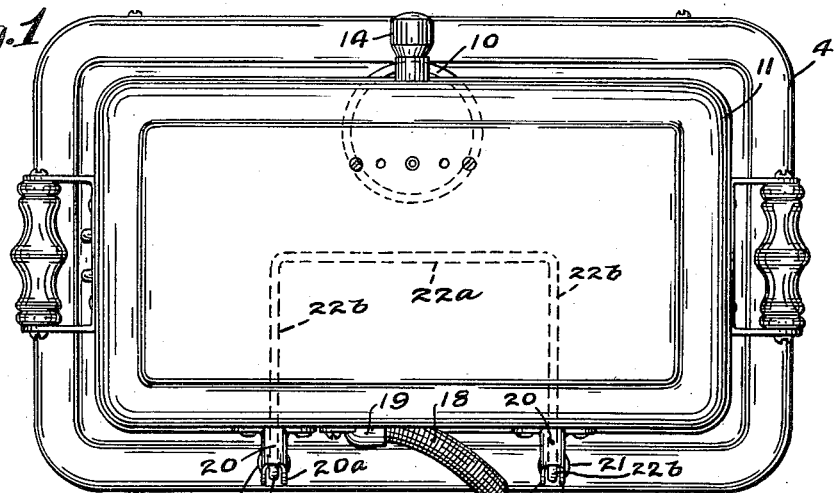
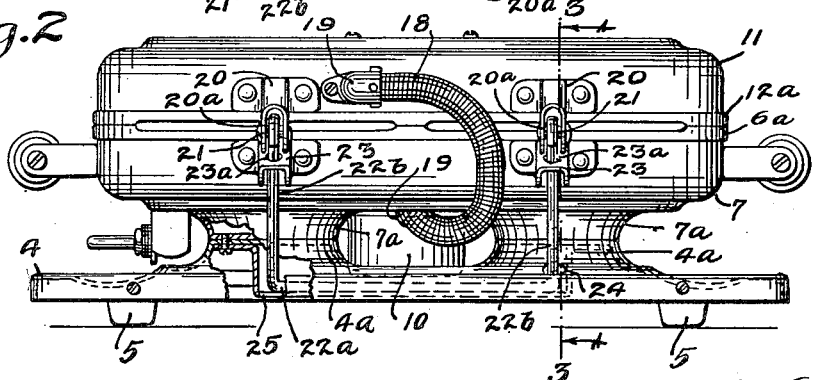
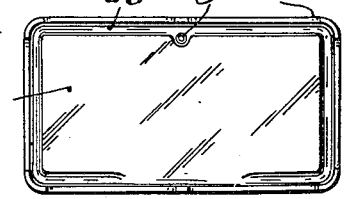
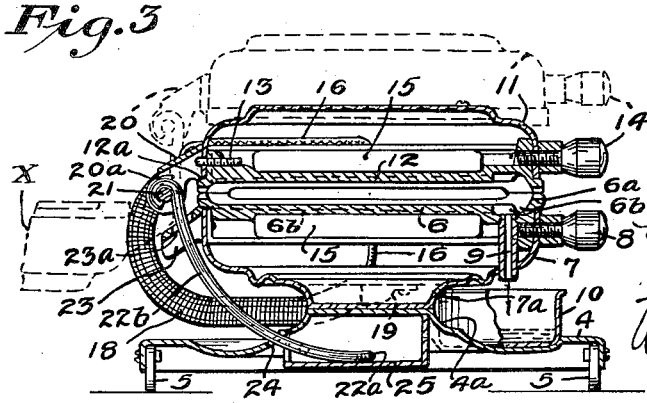
Inventor
William A. Barnes
By his Attorneys
Williamson Reif
& Williamson Patented May 5, 1931

1,804,196

UNITED STATES PATENT OFFICE

WILLIAM A. BARNES, OF MINNEAPOLIS, MINNESOTA, ASSIGNOR TO DOMINION ELECTRICAL MFG. COMPANY, OF MINNEAPOLIS, MINNESOTA, A CORPORATION OF MINNESOTA

ELECTRICAL COOKING APPLIANCE

Application filed November 11, 1929. Serial No. 406,402.

This invention relates to electrical cooking appliances and especially to appliances having a wide range of utility and adapted to apply heat to both the lower and upper surfaces of the food to be cooked.

It is an object of my invention to provide a highly efficient electrical cooking appliance adapted to cook a wide variety of foods and having upper and lower grids each heated by a suitable heating element, said grids being so connected that they may be disposed one above the other in different spaced relation to properly engage the upper and lower surfaces of food articles which vary considerably in thickness and in order that the upper section or grid may be swung outwardly into horizontal position with its cooking surface disposed substantially in the same plane as that of the lower grid for independent cooking on said grids.

A further object is to provide simple but highly efficient slip hinge structure for connecting the upper and lower sections of cooking appliances and analogous devices to render said devices capable of the functions described in the preceding paragraph, said hinge structure working efficiently with elongated appliances having their longitudinal edges hingedly connected together and entirely eliminating the disagreeable binding of the slidable elements of the slip hinge which is so common in most constructions of this type. With my device the connected edges of the upper and lower sections will always be maintained substantially in parallel relation during the elevation of the upper section.

These and other objects and advantages of the invention will be apparent from the following description made in connection with the accompanying drawings wherein like reference characters refer to similar parts throughout the several views and wherein Fig. 1 is a top plan view of an embodiment of my invention with the device in closed position;

Fig. 2 is a rear elevation of the same;

Fig. 3 is a cross section taken on the line 3—3 of Fig. 2, the dotted lines indicating two different moved positions of the upper grid; and Fig. 4 is a plan section of one of the grids detached showing the drain groove.

The embodiment of the invention illustrated in the drawings includes a generally rectangular base 4 having a flanged downturned edge which, if desired, may be supported from a table or other supporting surface by means of a plurality of legs 5, usually constructed of heat insulating material. The lower grid 6 which, as shown, is of rectangular shape having a substantially smooth cooking surface is nested in a lower shell member 7, said shell member being suitably secured to portions of base 4 and as shown being provided with a pair of depending bosses 7a which are bolted or otherwise secured to corresponding upstanding bosses 4a provided in base 4. Grid 6 has an outwardly extending peripheral flange 6a which is adapted to abut the upper peripheral edge of shell 7 and said grid is detachably secured to the shell by means of a suitable set screw 8 working through the front vertical wall portion of shell 7. A short vertical drain pipe 9 is secured to the lower forward portion of grid 6 communicating at its upper end with a drain groove 6b, which, as shown in Fig. 4, extends most of the distance around the edges of grid 6 increasing in depth from the rear edge of the grid to the central portion of the forward edge where communication is made with drain pipe 9. A small drip receptacle 10 is loosely supported upon base 4 below the lower end of drain pipe 9.

An upper section is hingedly secured to the lower section of my device previously described, said upper section comprising a vertical shell member 11 having an ornamental generally rectangular top portion and depending peripheral edges wherein the upper grid 12 is nested, said upper grid having an outwardly projecting flange 12a engaging said edge of shell 7 and detachably secured thereto by means of the cooperation of pins 13 at the rear longitudinal edge, which pins project through suitable apertures in the rear vertical portion of shell member 11 and a set screw 14 working through the forward portion of shell member 11 and engaging a suitable detent in grid 12. Each of the sections of my device are provided with a suitable electrical heating element 15, which may be suitably incased and secured to the outwardly disposed surface of one of the grids. The two heating elements 15 are electrically connected in conventional manner by means of insulated service wires 16, which preferably are passed through a flexible conduit 18 usually of coiled metal construction, the ends of said conduit being secured and housed within suitable sockets 19, one of which is attached to the rear portion of the upper shell 11, the other of which may be attached to the lower central portion of the lower shell 7. Enough slack is left in electrical service wires 16 and in flexible conduit 18 to permit the upper and lower sections of the device to be moved a considerable distance apart and to facilitate swinging movement of said sections relative to each other.

The two cooking sections of my device are connected together by an improved slip hinge, which constitutes a novel and important part of my invention. A pair of hinge brackets 20 are secured to the rear vertical portion of shell 11 in widely spaced relation, said brackets each having a pair of outwardly extending spaced ears 20a between which horizontal pivot pins or rivets 21 are secured. A relatively large bail-like member 22, which may be constructed of relatively stiff wire or circular rod material is swingably secured at its upper ends to pivots 21. Bail member 22 has a substantially straight intermediate section 22a and a pair of curved arms 22b. The spaced arms 22b slidably work through eyes 23a provided in a pair of rearwardly projecting abutment lugs 23 rigidly secured to the rear vertical portion of lower shell member 7 and also work through eyes 24 provided through base 4 adjacent the bossed portions 4a thereof. The straight intermediate portion 22a of said bail member is housed beneath base 4 by the cooperation of the upper portion of said base with a shell-like rectangular casing 25 having attachment flanges at the ends thereof, which are secured to the bossed portions 4a of the base and also to the depending bossed portions 7a of shell member 7. The upward slidable movement of the bail member is limited by abutment of the intermediate straight portion 22a with the apertured side of casing 25. The arms 22b of the bail member are so curved that the upper section of the device may be raised in substantially vertical alinement with the lower section throughout the movement of arms 22b.

*Operation*

The operation of my improved device may be briefly described as follows:—

The upper cooking section may be swung upwardly and outwardly relative to the base and the lower section, swinging on the axis of pivot pins 21, hinge ears 20a then abutting lug 23. If an article of food having considerable thickness, such as for example, a sandwich, chop or steak is to be cooked, the same is placed upon the lower grid 6 and if it is desirable to apply heat to both sides of the article of food, the upper section is swung downwardly, grid 12 being supported upon the top of the article to be cooked. This causes the bail member 22 to slide upwardly a sufficient distance to enable the surface of grid 12 to be disposed flush against the article to be cooked and usually parallel and spaced from the upper surface of grid 6. It will be seen that a wide range of adjustability is possible with my improved slip hinge depending upon the length of arms 22b with reference to the abutment portion of casing 25. In Fig. 3, the raised position of the upper section is shown, illustrating how the device would readily accommodate a thick sandwich or steak with the grid surface disposed flush against the surface to be cooked. It will be obvious that with my structure the upper and lower surfaces of an article of food may be cooked efficiently and evenly, the same intensity of heat being applied thereto.

Where several articles of food are to be cooked, it is often desirable to utilize both upper and lower cooking sections for supporting grids. With my device the upper section may be swung to the dotted position, indicated by the letter X in Fig. 3 with the grid surface disposed horizontally and food may be disposed on both of the grids 6 and 12 and heat applied to the under surface of the food.

With most appliances extensively used at this time having slip hinge construction connecting the upper and lower sections, the connected edges of the sections are not maintained in parallel relation when the upper section is raised or spaced from the lower section, and the slidable elements often bind badly in their guides, greatly impairing the efficiency of the device. This is especially true where the appliances or devices are elongated and where the longitudinal edges are connected by a slip hinge structure.

With my structure, due to the fact that the slidable members or arms 22b are integrally formed or rigidly connected, and due to the fact that said arms are curved, the connected edges of the two sections will always be maintained substantially parallel in raising the upper section and the arms will never bind in their guides or eyes. My device is especially applicable for connecting the longitudinal edges of elongated sections and will function in a highly efficient manner even when the arms are spaced apart a considerable distance.

It will be apparent that greases or juices from the cooking food will run down the drain groove 6b and through the drain spout 9 into the drip receptacle 10 supported therebelow and may thus be conserved and removed from the grids.

To remove the grids for cleaning, it is only necessary to loosen the set screws 14 and 8 and lift the same from their respective shell members. The device is compact in form, well adapted for manufacture at low cost and extensive use has proven it highly successful for the purposes intended.

It will be readily apparent that the device is adapted for cooking a wide variety of different foods and that the relation between the cooking surfaces of the upper and lower grids will be automatically regulated by the thickness of food disposed upon the lower grid when the sections are swung together.

It will, of course, be understood that various changes may be made in the form, details, arrangement and proportions of the parts without departing from the scope of applicant's invention.

What is claimed is:

1. In a cooking appliance, a base, a lower grid section secured to said base, an upper grid section, connections between said sections including a U-shaped member having spaced upwardly extending arms, pivotal connections between the upper ends of said arms and said upper section and guide elements in said lower section in which said arms are slidably disposed, said arms being so curved and arranged in said guide elements that said upper grid section will always be disposed vertically above said lower grid section when in horizontal position.

2. In a cooking appliance, a base, a lower grid section secured to said base, an upper grid section, and connections between said sections comprising a substantially rigid U-shaped rod having spaced upwardly extending arms pivotally connected at their upper ends to said upper section, guide elements on said lower section in which said arms are slidably disposed and abutment means on said base for engaging the intermediate portion of said U-shaped member to limit the upward slidable movement of said member, said arms being so curved and arranged in said guide elements that said upper grid section will always be disposed vertically above said lower grid section when in horizontal position.

3. In a cooking appliance, a hollow base, a lower section secured to said base, an upper section connected to said lower section by means of a slip hinge structure comprising a downwardly and inwardly curved member pivotally connected at its upper end to said upper section, a guide secured to said lower section in which said curved member is slidably mounted, and a second guide in said base, the lower extremity of said curved element being slidably disposed therein, and abutment means at said lower extremity for engaging said base to limit the upward slidable movement of said member, said arms being so curved and arranged in said guide elements that said upper grid section will always be disposed vertically above said lower grid section when in horizontal position.

4. In a cooking appliance, a horizontal base, a lower grid section secured to said base having a substantially horizontal cooking surface, an upper grid section having a cooking surface adapted to be opposed to said first mentioned cooking surface, and connections between said sections comprising a pair of downwardly and inwardly curved arms, the upper ends of which are pivotally connected to said upper sections, guides on said lower section in which said arms are slidably mounted, said arms being so curved and arranged in said guides that said upper grid section will always be disposed vertically above said lower section when in horizontal position, the lower portions of said arms extending slidably through said base and having inturned ends adapted to limit the upward movement of said arms.

In testimony whereof I affix my signature.

WILLIAM A. BARNES.